United States Patent [19]
Takami et al.

[11] Patent Number: 4,773,895
[45] Date of Patent: Sep. 27, 1988

[54] DOUBLE RIBBED BELT

[75] Inventors: Eiichi Takami; Takeshi Murakami; Koji Kitahama, all of Kobe, Japan

[73] Assignee: Mitsuboshi Belting Ltd., Nagata, Japan

[21] Appl. No.: 59,937

[22] Filed: Jun. 9, 1987

[30] Foreign Application Priority Data

Jun. 9, 1986 [JP] Japan .............................. 61-88437[U]

[51] Int. Cl.$^4$ ............................ F16G 1/10; F16G 5/08
[52] U.S. Cl. .................................... 474/238; 474/263
[58] Field of Search ............... 474/237, 238, 249, 252, 474/263, 265

[56] References Cited

U.S. PATENT DOCUMENTS

| | | | |
|---|---|---|---|
| 2,531,111 | 11/1950 | Daniels | 474/238 X |
| 3,981,206 | 9/1976 | Miranti, Jr. et al. | 474/263 X |
| 4,216,679 | 8/1980 | Howerton et al. | 474/263 X |

Primary Examiner—Thuy M. Bui
Attorney, Agent, or Firm—Wood, Dalton, Phillips, Mason & Rowe

[57] ABSTRACT

A power transmission ribbed V-belt having a plurality of outer ribs and a plurality of inner ribs. The number of outer ribs and height of the outer ribs differs from the number and height of the inner ribs. In the preferred embodiment, the ribs define trapezoidal distal portions having cylindrically rounded corners and planar end faces. Other rib configurations are disclosed. In the illustrated embodiment, the ribs are spaced from the midportion of the belt carrying the tensile cords by base sections, and transversely extending short reinforcing fibers are provided for improved lateral stability of the belt.

18 Claims, 2 Drawing Sheets

DOUBLE RIBBED BELT

TECHNICAL FIELD

This invention relates to power transmission belts and in particular to ribbed power transmission belts.

BACKGROUND ART

It has been conventional to drive accessory components associated with internal combustion engines and the like, such as used in vehicles, by means of flexible power transmission belts. A common form of such power transmission belt comprises a V-belt entrained about complementary grooved pulleys on the engine and accessory equipment.

In the modern vehicle engine, a number of such accessories, such as alternators, cooling fans, power steering pumps, air conditioner compressors, etc., are provided. It has been conventional to utilize a plurality of individual V-belts for driving such a plurality of accessories.

More recently, multiple ribbed V-belts have been developed wherein the inner surface of the belt is provided with a plurality of side-by-side longitudinally extending V-shaped ribs. Such a belt has been utilized to drive a plurality of the accessories by directing the multiple ribbed belt in a serpentine path wherein the V-ribbed portion engages, successively, the pulleys of the different accessories.

The back surface of the belt is engaged with an idler pulley for regulating the tension of the belt and, in certain instances, the back surface is used to drive a flat pulley. Such drive systems have not proven completely satisfactory in that the back surface tends to wear, thereby causing slippage relative to the driven pulley.

It has been proposed to overcome the problem of the back surface slippage by providing, on the back surface, a plurality of ribs similar to the plurality of ribs on the front surface, whereby both surfaces may drive multiple grooved pulleys in the same manner. One such double V-ribbed belt is disclosed in U.S. Pat. No. 2,728,239.

It has been found that such double V-ribbed belts are limited in their useful life because of cracking of the ribs after a relatively small number of hours of power transmission operation. The belts having a flat outer surface are limited in the useful life thereof because of substantial slippage under load.

DISCLOSURE OF INVENTION

The present invention comprehends an improved power transmission belt construction wherein both the inner and outer surfaces of the V-belt are ribbed so as to provide power transmission driving through both ribbed surfaces. The invention comprehends the provision of the ribs on the outer and inner surfaces with different pitches and heights.

More specifically, the invention comprehends the provision of such a power transmission ribbed belt wherein the ribs on the outer portion differ in number from the ribs on the inner portion.

The invention further comprehends the provision of such a power transmission ribbed belt wherein the height of the ribs on the outer portion differ from the height of the ribs on the inner portion.

In the illustrated embodiment, the number of ribs on the inner portion is less than the number of ribs on the outer portion and the height of the ribs on the outer portion is less than the height of the ribs on the inner portion.

The invention comprehends that the number of ribs on both portions comprise a whole number.

In the illustrated embodiment, the ribs comprise tapered ribs having an included angle in the range of approximately 20° to 80°.

In the illustrated embodiment, the portions of the belt inwardly and outwardly of the midportion carrying the tensile cords are provided with transversely extending short reinforcing fibers.

The invention further comprehends the provision of the ribs as frustoconical ribs having rounded distal corners.

In another form, the ribs define frustoconical distal portions having angular corners.

In still another form, the ribs comprise tapered ribs of triangular cross section.

In still another form, the ribs comprise tapered ribs having a cylindrically rounded distal portion.

In the illustrated embodiment, the ribs are spaced outwardly from the midportion carrying the tensile cords by a base section.

The base section may include transversely extending short reinforcing fibers.

In the illustrated embodiment, the height of the inner ribs is approximately $1\frac{1}{2}$ to $2\frac{1}{4}$ times the height of the outer ribs. The included angle of the ribs is in the range of approximately 32° to 44°. The number of outer ribs is six and the number of inner ribs is four.

The power transmission belt of the present invention is extremely simple and economical of construction, while yet providing highly improved functioning and long life.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
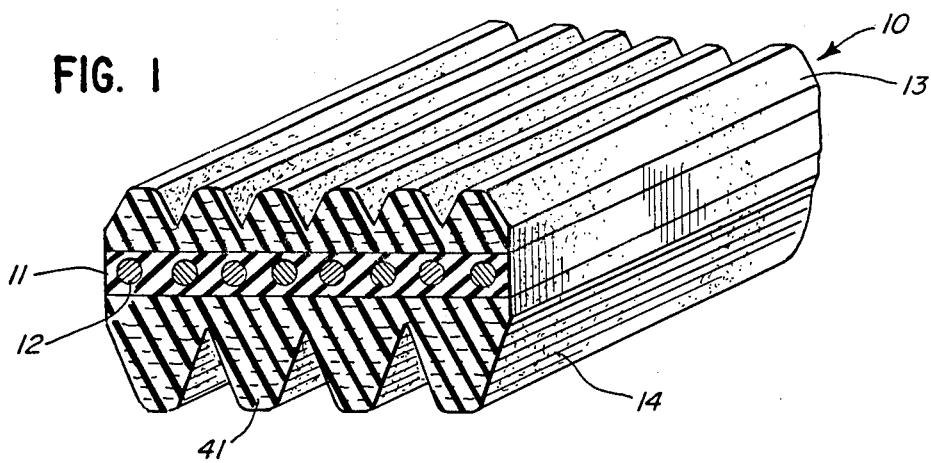
FIG. 1 is a fragmentary perspective view of a section of a power transmission belt embodying the invention.

In the illustrative embodiment of the invention as disclosed in the drawing, a power transmission belt generally designated 10 comprises a double V-ribbed belt having a midportion 11 provided with a plurality of transversely spaced, longitudinally extending tensile cords 12.

The belt further defines an outer portion generally designated 13, and an inner portion generally designated 14. The outer portion includes a base section 15 adjacent the midportion 11, and a plurality of outwardly projecting, continuous longitudinally extending side-by-side V-ribs generally designated 16.

The inner portion 14 is defined by a base section generally designated 17 and a plurality of inwardly projecting V-ribs generally designated 18.

The invention comprehends the provision of an asymmetrical arrangement of the inner and outer ribs. More specifically, the invention comprehends that the number of outer ribs be different from the number of inner ribs and the height of the outer ribs be different from the height of the inner ribs. In the preferred embodiment, the number of outer ribs is greater than the number of inner ribs, and the height of the inner ribs is greater than the height of the outer ribs.

The invention comprehends that the number of outer ribs be a whole number and that the number of the inner ribs be a whole number.

In the illustrated embodiment, the height of the inner ribs is in the range of approximately 1.5 to 2.25×the height of the outer ribs. As further illustrated in FIGS. 1 and 2, in the illustrated embodiment, the number of inner ribs is four and the number of outer ribs is six.

Figure 2:
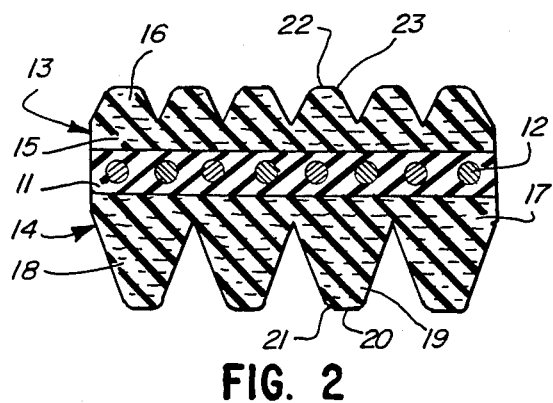
FIG. 2 is a transverse section thereof.
Figure 2A:
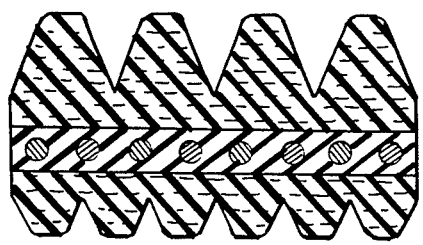
FIG. 2A is a transverse section of a reverse arrangement thereof.

In the preferred embodiment, the distal end 19 of the ribs 18 defines a trapezoidal section having a planar midportion 20 and cylindrical rounded corners 21. As shown in FIG. 2, the outer ribs 16 similarly define a planar midportion 22 and rounded corners 23.

As further illustrated in FIGS. 1 and 2, the outer portion 13 and inner portion 14 of the belt are provided with distributed, transversely extending short reinforcing fibers. As shown, the reinforcing fibers may be provided in the ribs 16 and 18, as well as in the base sections 15 and 17, for providing improved lateral stability of the belt in power transmission operation.

Figure 3:
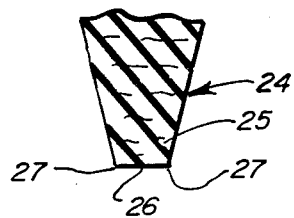
FIG. 3 is a fragmentary section of another form of rib for use in a power transmission belt of the invention.

The invention comprehends the provision of the outer and inner ribs having a number of additional cross-sectional configurations. Thus, as seen in FIG. 3, the ribs generally designated 24 may comprise ribs having a trapezoidal distal portion 25 defined by a planar end surface 26 and relatively sharp corners 27.

Figure 4:
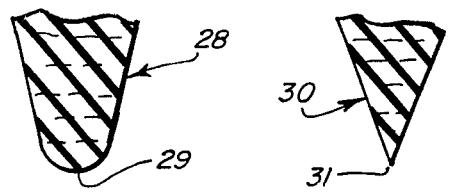
FIG. 4 is a fragmentary section of still another form of rib for use therein.

As shown in FIG. 4, another form of rib embodying the invention comprises a rib 28 having a cylindrically arcuate distal end portion 29.

Figure 5:
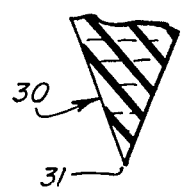
FIG. 5 is a further fragmentary transverse section of yet another form of rib for use therein.

Referring to FIG. 5, still another form of rib embodying the invention comprises a rib 30 having a triangular cross section defining a sharp distal tip 31.

Each of ribs 24, 28, and 30 may be utilized as the outer and inner ribs of the belt. Ribs 24, 28 and 30 may include transversely extending reinforcing fibers, as shown.

Each of the outer and inner ribs is tapered so as to define an included angle in the range of approximately 20° to 80°. A more specifically preferred range is from approximately 32° to 44°.

The height of the outer ribs is preferably in the range of approximately 1.3 mm. to 1.6 mm., and the height of the inner ribs is preferably in the range of approximately 2.4 to 2.9 mm. The resultant height of the inner ribs to the height of the outer ribs is in the range of approximately 1.5 to 2.25.

The outer and inner ribs may have similar taper angles or may have different taper angles, as desired. Similarly, the outer and inner ribs may have the same or different cross-sectional configurations, as desired.

In the illustrated embodiment, as discussed above, the inner ribs have a greater height and smaller number as compared to the outer ribs. The invention comprehends a reverse arrangement wherein the outer ribs have a greater height and smaller number as compared to the inner ribs.

As will be obvious to those skilled in the art, the ribs may be provided with a conventional cover fabric for further improved crack resistance of the ribs.

Figure 6:
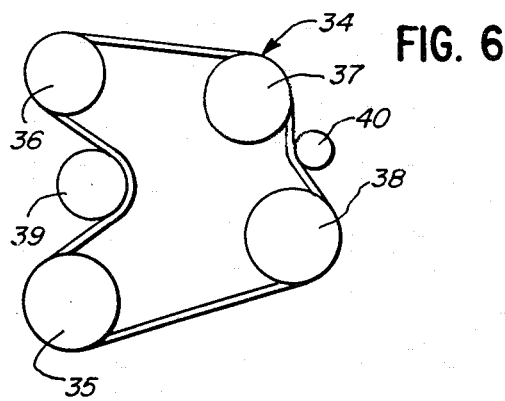
FIG. 6 is a schematic elevation illustrating the use of a double V-belt of the invention in a drive system.
Figure 9:
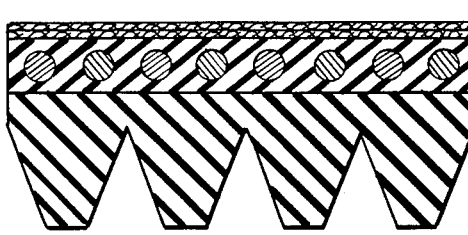
FIG. 9 is a transverse section illustrating the construction of one form of prior art belt.
Figure 10:
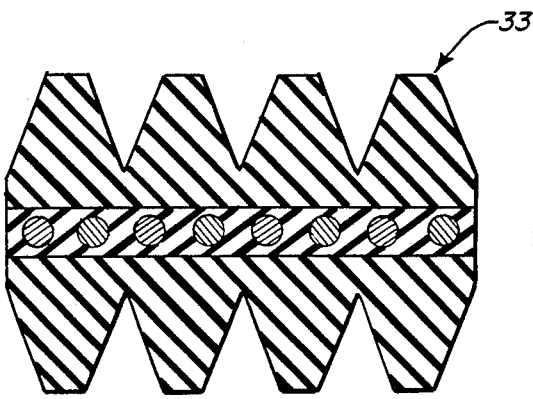
FIG. 10 is a transverse section illustrating the cross section of another form of prior art belt comprising a double V-ribbed belt.

The power transmission rib belt construction of the present invention has proven to provide substantially improved troublefree life as compared to the prior art belt constructions, such as belt construction 32 shown in FIG. 9 and belt construction 33 shown in FIG. 10, when utilized in a drive system, such as drive system 34 illustrated in FIG. 6. Thus, the drive system 34 may include a driver pulley 35, a plurality of front face pulleys 36, 37 and 38, and a back face pulley 39. An idler pulley 40 is provided for maintaining desired tension in the belt. As indicated above, the power transmission belt of the present invention provides improved long life, low slippage drive operation.

Figure 7:
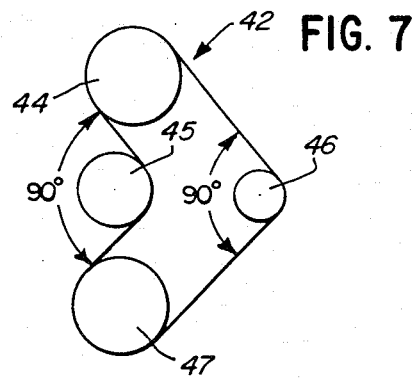
FIG. 7 is a schematic front elevation of a test set up for use in testing the power transmission belt of the present invention and that of the prior art.

More specifically, the characteristics of power transmission belt 10 were compared with the characteristics of power transmission belts 32 and 33 of the prior art in a test drive system generally designated 42 illustrated in FIG. 7, wherein a 120 mm. driver pulley 43, a 120 mm. diameter driven pulley 44, a 100 mm. back face driven pulley 45, and a 70 mm. idler pulley 46 were provided. As shown, the wrap angle of the belt about the pulleys 45 and 46 was approximately 90°. A load of 30 kg. of belt tension was applied, with the drive pulley being operated at 4900 rpm, and a 12 hp. load on the driven pulley 44, with the drive system operating at ambient temperatures. The slip percentages of the belt were determined while increasing the load on the driven pulley 44. The results of the test are shown in the graph of FIG. 8.

Figure 8:
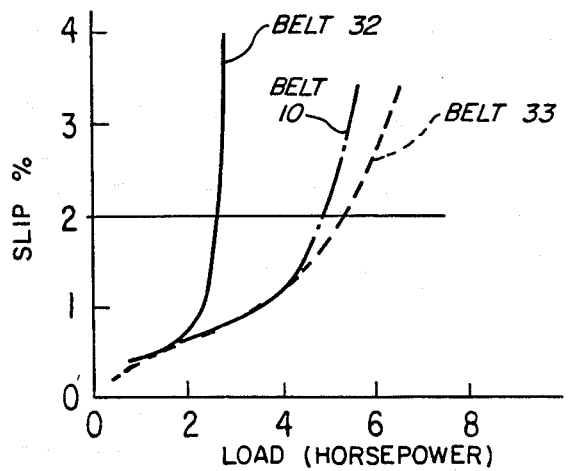
FIG. 8 is a graph illustrating the relationship between the slip percentage and applied load of the power transmission of the present invention and that of the prior art.

As shown in FIG. 8, as the load on belt 32 was increased beyond 2 hp., the belt slippage increased rapidly. The belt slippage in each of belts 10 and 33 increased gradually and was substantially similar at a 4 hp. load.

The useful life of the belt was determined by running the belts 10, 32 and 33 at a 2 hp. load and at a 4 hp. load, as shown in the following Table 1.

TABLE 1

| | Belt Lifetime | |
|---|---|---|
| | 2.0 HP of Dn2 load | 4.0 HP of Dn2 load |
| Belt 10 | Rib cracking life of 659 hrs. | Rib cracking life of 336 hrs. |
| Belt 32 | Rib cracking life 741 hrs. | Slip life of 19 hrs. |
| Belt 33 | Rib cracking life life of 521 hrs. | Rib cracking life of 266 hrs. |

Thus, as indicated in Table 1, the prior art belt 32 had a useful life limited by the 19-hour slip life at 4 hp. load.

As further shown in Table 1, belt 10 has a substantially greater rib cracking life as compared to belt 33, at both the lower 2 hp. load and the higher 4 hp. load. The improved useful life of the power transmission belt of the present invention appears to provide a reduction in the heat of the belt generated during operation thereof, and improved bending resistance fatigue while maintaining desired power transmission on the back face drive pulley. Because of the improved performance of the belt construction of the present invention, a reduced width belt may be utilized at lower loads, permitting reduction in the overall size of the drive system utilizing the double V-ribbed belt.

The slip percentages determined in FIG. 8 were determined by the formula:

$$S = \frac{I_o - I_f}{I_o} \times 100 \text{ where } I_o = \frac{R_{no}}{R_{ro}} \text{ and } I_f = \frac{R_{nf}}{R_{rf}}$$

where $R_{no}$=the rotating speed of the driven pulley under no load, where $R_{ro}$=the rotating speed of the drive pulley under no load, $R_{nf}$=the rotating speed of the driven pulley under load, and $R_{rf}$=the rotating speed of the drive pulley under load.

The midportion 11 of the power transmission belt comprises a cushion rubber portion formed of a suitable elastomeric material, such as natural rubber, styrene-butadiene rubber, chloroprene rubber, nitrile rubber, hydrogenated nitrile rubber, chlorosulfonated polyethylene rubber, polyurethane, or a mixture of two or more thereof. The tensile cords comprise conventional tensile cords and, illustratively, are formed of polyester, polyamide, aramid, carbon or glass fibers. The face sections and ribs may be formed of elastomeric materials similar to that of the cushion rubber. The reinforcing fibers may be formed of any suitable reinforcing material, such as glass fibers, etc.

The specific parameters of the belts tested in deriving the graph of FIG. 8 and Table 1 were as follows:

TABLE 2

|  | Belt 10 | Prior Art Belt 32 | Prior Art Belt 33 |
|---|---|---|---|
| Belt length | 1150 mm | 1150 mm | 1150 mm |
| Belt Thickness | 6.4 mm | 5.8 mm | 7.8 mm |
| Cushion rubber 11 thickness | 1.6 mm | 1.6 mm | 1.6 mm |
| Inner rib pitch | 3.56 mm | 3.56 mm | 3.56 mm |
| Inner rib height | 2.9 mm | 2.9 mm | 2.9 mm |
| Inner rib number | 4 | 4 | 4 |
| Outer rib pitch | 2.34 mm | — | 3.56 mm |
| Outer rib height | 1.5 mm | — | 2.9 mm |
| Outer rib number | 6 | — | 4 |
| Belt width | 14.4 mm | 14.4 mm | 14.4 mm |

The foregoing disclosure of specific embodiments is illustratively of the broad inventive concepts comprehended by the invention.

We claim:

1. In a power transmission ribbed belt having a midportion formed of a first material comprising cushion rubber free of stiffening fibers and provided with a plurality of laterally spaced, longitudinally extending tensile cords, the improvement comprising:
an outer portion formed of a second material different from said first material comprising rubber having transverse stiffening fibers distributed therein and having a plurality of side-by-side longitudinally extending continuous first ribs; and
an inner portion formed of said second material and having a plurality of side-by-side longitudinally extending continuous second ribs, the number of first ribs being different from the number of second ribs, each of said first and second ribs being spaced from said midportion by a body of said fiber reinforced second rubber material between said midportion and said ribs.

2. In a power transmission ribbed belt having a midportion formed of a first material comprising cushion rubber free of stiffening fibers and provided with a plurality of laterally spaced, longitudinally extending tensile cords, the improvement comprising:
an outer portion formed of a second material different from said first material comprising rubber having transverse stiffening fibers distributed therein and having a plurality of side-by-side longitudinally extending continuous first ribs; and
an inner portion formed of said second material and having a plurality of side-by-side longitudinally extending continuous second ribs, the height of said first ribs being different from the height of said second ribs, each of said first and second ribs being spaced from said midportion to provide a body of said fiber reinforced second rubber material between said midportion and said ribs.

3. In a power transmission ribbed belt having a midportion formed of a first material comprising cushion rubber free of stiffening fibers and provided with a plurality of laterally spaced, longitudinally extending tensile cords, the improvement comprising:
an outer portion formed of a second material different from said first material comprising rubber having transverse stiffening fibers distributed therein and having a plurality of side-by-side longitudinally extending continuous first ribs; and
an inner portion formed of said second material and having a plurality of side-by-side longitudinally extending continuous second ribs, the number and height of said first ribs being different from the number and height of said second ribs, each of said first and second ribs being spaced from said midportion to provide a body of said fiber reinforced second rubber material between said midportion and said ribs.

4. In a power transmission ribbed belt having a midportion provided with a plurality of laterally spaced, longitudinally extending tensile cords, the improvement comprising:
an outer portion having a plurality of side-by-side longitudinally extending first ribs, wherein adjacent ones of said first ribs define continuous longitudinally extending grooves therebetween; and
an inner portion having a plurality of side-by-side longitudinally extending second ribs, the number and/or height of said first ribs being different from the number and/or height of said second ribs.

5. The power transmission ribbed belt of claims 1, 2, 3 or 4 wherein said number of first ribs is less than said number of second ribs.

6. The power transmission ribbed belt of claims 1, 2, 3 or 4 wherein said number of second ribs is less than said number of first ribs.

7. The power transmission ribbed belt of claims 2, 3 or 4 wherein said height of the first ribs is less than said height of the second ribs.

8. The power transmission ribbed belt of claims 2, 3 or 4 wherein said height of the second ribs is less than said height of the first ribs.

9. The power transmission ribbed belt of claims 1, 2, 3 or 4 wherein the number and height of said first ribs is less than the number and height of said second ribs.

10. The power transmission ribbed belt of claims 1, 2 3 or 4 wherein the number and height of said second ribs is less than the number and height of said first ribs.

11. The power transmission ribbed belt of claims 1, 2, 3 or 4 wherein at least a portion of said ribs have trapezoidal-shaped distal ends.

12. The power transmission ribbed belt of claims 1, 2, 3 or 4 wherein at least a portion of said ribs have trapezoidal-shaped distal ends defining rounded corners.

13. The power transmission ribbed belt of claims 1, 2, 3 or 4 wherein at least a portion of said ribs define rounded distal ends.

14. The power transmission ribbed belt of claims 1, 2, 3 or 4 wherein at least a portion of said ribs define V-shaped distal ends.

15. The power transmission ribbed belt of claims 1, 2, 3 or 4 wherein at least one of said outer and inner portions includes a base section extending fully transversely across said belt adjacent said midportion.

16. The power transmission ribbed belt of claims 1, 2, 3 or 4 wherein said ribs are tapered at an included angle in the range of approximately 20° to 80°.

17. The power transmission ribbed belt of claims 1, 2, 3 or 4 wherein the number of ribs in each plurality is a whole number.

18. The power transmission ribbed belt of claims 1, 2, 3 or 4 wherein said inner ribs have a height in the range of approximately 1.5 to 2.25 the height of the outer ribs.

* * * * *